(12) United States Patent
Minier et al.

(10) Patent No.: US 6,551,649 B1
(45) Date of Patent: Apr. 22, 2003

(54) FAST COOKING CONVERTED RICE

(75) Inventors: Chantal Minier, Aubagne (FR);
Isabelle Arekion, Marseilles (FR);
Olivier Lepez, Viarmes (FR)

(73) Assignee: Rivoire et Carret-Lustucru, Marseilles (FR)

( * ) Notice: Subject to any disclaimer, the term of this patent is extended or adjusted under 35 U.S.C. 154(b) by 0 days.

(21) Appl. No.: 09/719,529

(22) PCT Filed: Jun. 15, 1999

(86) PCT No.: PCT/FR99/01420

§ 371 (c)(1),
(2), (4) Date: Jan. 2, 2001

(87) PCT Pub. No.: WO99/65333

PCT Pub. Date: Dec. 23, 1999

(30) Foreign Application Priority Data

Jun. 17, 1998 (FR) .............................................. 98 07628

(51) Int. Cl.⁷ .............................. A23L 1/00; A23L 1/10
(52) U.S. Cl. ........................ 426/627; 426/510; 426/615
(58) Field of Search ................................ 426/627, 510, 426/615

(56) References Cited

U.S. PATENT DOCUMENTS 2,740,719 A  *  4/1956  Ozai-Durrani .............. 426/627

FOREIGN PATENT DOCUMENTS

| EP | 0 393 870 A1 | 10/1990 |
| GB | 1092836 | 11/1967 |
| WO | WO98/43496 | 10/1998 |

OTHER PUBLICATIONS

Database WPI, Section Ch, Week 9810, Derwent Publications Ltd., London, GB; Class D13, AN 98–103971 XP002096475 & JP 09 322725 A (Nippon Suisan Kaisha Ltd), Dec. 16, 1997 (abstract).

* cited by examiner

*Primary Examiner*—Helen Pratt
(74) *Attorney, Agent, or Firm*—Pearne & Gordon LLP

(57) ABSTRACT

The invention concerns the use of rice having an amylose content less than 15 wt. % for preparing converted rice capable of being cooked in five minutes.

7 Claims, No Drawings

FAST COOKING CONVERTED RICE

Steamed rice is a rice that has been subjected to steeping, thermal treatment, drying and, often, machining. This treatment permits, in particular, a non-sticky rice to be obtained, the grains of which are intact, but with the drawback that the cooking-time is lengthy. The invention overcomes this drawback by virtue of a steamed rice having a greatly shortened cooking-time.

The varieties of rice having an amylose content lower than 15%, relative to dry matter, include, in particular, perfumed varieties of rice from Thailand having an amylose content generally amounting to between 10% and 15%, which hitherto have been sold as they are, just blanched in order better to preserve all their aroma. There are many other, less expensive varieties of rice for steaming.

In accordance with the invention, steaming is carried out in respect of rice having an amylose content lower than 15% by weight, relative to dry matter, amounting in particular to between 10% and 15%.

It has been found, unexpectedly, that steamed rice having an amylose content lower than 15% by weight, relative to dry matter, whether it be cargo rice or paddy rice, can be cooked in 5 minutes after being subjected to steaming. Varieties of rice having an amylose content lower than 10% are known which are also suitable for the invention.

Steamed rice that is suitable for rapid cooking can preferably be prepared by steeping the rice having an amylose content lower than 15% by weight in water at a temperature lower than 70° C., in particular between 40 and 70° C., under such conditions and for such a time that, after removal of the surface water by drainage or spin-drying, steeped rice is obtained having a moisture content by weight greater than 31%, by afterwards carrying out a gelatinisation of the steeped rice by heating it to a temperature greater than 130° C. while maintaining the moisture at a weight content greater than 22% for a sufficient period, for example a period of at least 8 minutes, to obtain core-gelatinised rice, and by carrying out gelatinisation by causing the steeped rice to pass continuously into an enclosure so as to limit, by virtue of the equilibrium which is established within the enclosure between the moisture content of the rice which is undergoing gelatinisation and the moisture content of the gaseous atmosphere of the enclosure, the quantity of vapour emitted from the rice during gelatinisation, in order to maintain the moisture content by weight of the rice in the course of gelatinisation at a value greater than 22%, and by heating up the steeped rice in the enclosure essentially by conduction so as not to increase the moisture content by weight of the gelatinised rice appreciably, and in particular so as not to exceed a content of 28%.

When carrying out a standard parboiling in water vapour it is found that this type of rice cooks more rapidly than the other types.

The grains of parboiled rice have the following property: the cooked grains, placed in a hermetically sealed receptacle and put in the refrigerator at 4° C. for 6 days, have a firmness measured in the visco-elastograph equal to or less than 120% of that which they have 15 minutes after cooking. This property is very much sought-after, particularly when a dish has to be prepared in advance. The grains do not harden upon cooling.

The following Examples illustrate the invention.

EXAMPLE 1

600 kg of perfumed Khao Dawk Mali cargo rice are placed in a vat and covered by 1,500 litres of water at 65° C. The rice is left in contact with the water for 3 hours. The steeping water is then discharged, and the rice is extracted from the vat by gravity and drained. Its moisture content is then equal to 31.4%. It is then conveyed at a rate of flow from 100 to 600 kg/h (in accordance with various trials which have all given satisfaction) to an enclosure constituted by a coil with a length of 64 m and an internal diameter of 110 mm, the walls of which have been heated up beforehand to 190° C. The rice is transported from the inlet to the outlet of the enclosure by vibration at a speed of 7 m/minute. Its dwell-time is 8 minutes. Its temperature that is attained at the outlet of the enclosure is 130° C. Its moisture content is 25.5%. The cargo rice that has been treated in this way is then transported to columns for drying in hot air, where its moisture content is brought back to 12.5% for its preservation. It is then machined in accordance with the traditional process.

The rice that has been treated in this way and subjected to the alkali test exhibits 98% of completely translucent grains, that is to say completely gelatinized grains.

The alkali test is carried out as follows.

100 parboiled grains of rice are placed in a 1.7% solution by weight of KOH for 20 hours.

After 20 hours of reaction the degradation sustained by the grains is observed:

intact grains: non-gelatinised grains grains dispersed in an opaque chalky mass: only slightly gelatinised grains completely translucent dispersed grains without chalky opaque core: totally gelatinised grains.

The density of the grain is equal to 95% of the density of the same grain that has been machined but not treated. No fissure is visible to the eye or to the binocular magnifier.

This rice cooks for 5 minutes in boiling water and, cooled for 15 minutes in accordance with the protocol described above, exhibits the following texture characteristics which are measured in the visco-elastograph;

Fmean=59.0; standard deviation of 6 measurements=1.2.

The Chopin visco-elastograph (alveograph) permits the visco-elastic characteristics of the cooked rice to be evaluated by assessing its deformation under the application of a constant force of 700 g for 20 seconds and then relaxation of the force for 40 seconds.

For the measurement in the visco-elastograph, 100 g of rice are cooked in one litre of boiling water. At the end of cooking, the grains are drained for one minute on a sieve with a mesh size of 1.25 mm and are then left to cool for 15 minutes in a 60-mm Petri dish which is placed an a moist sponge plate and covered by an 80-mm Petri dish in such a way that the latter creates a seal with the water which saturates the sponge plate. Three grains that have been cooled in this way are then placed on the visco-elastograph. The thickness E of the grains before application of the force and the thickness $e_1$ after crushing are noted. From these values the firmness $F=100 \cdot (e_1/E)$ is calculated. Six measurements are carried out in respect of the same cooking, in order to calculate the mean and the standard deviation of the six results obtained.

EXAMPLE 2

A batch of grains of rice of the variety Khao Dawk Mali having an amylose content of 13.4% is parboiled by the same process as in Example 1, cooked for 10 minutes, drained for one minute, placed in a hermetically sealed receptacle and then put in the refrigerator at 4° C. for 6 days. The firmness of the grains is measured with the aid of the visco-elastograph 15 minutes after cooking and after six days in the refrigerator.

15 minutes after cooking: F=34.7 after 6 days at 4° C.: F=38.8

The firmness of the grains after six days at 4° C. is equal to 112% of that which was measured 15 minutes after cooking.

COMPARATIVE EXAMPLE 1

Unlike Example 2, a batch of grains of rice of the same variety Khao Dawk Mali that has not been parboiled but has simply been blanch-cooked for 11 minutes and kept for six days at 4° C. has a firmness equal to 171% of the firmness measured 15 minutes after cooking.

15 minutes after cooking: F=37.9 after 6 days at 4° C.: F=64.8

COMPARATIVE EXAMPLE 2

In the same manner, a batch of grains of rice of the variety Thai Bonnet having an amylose content of 26%, steamed as in Example 1 and cooked for ten minutes and then kept for six days at 4° C., has a firmness equal to 161% of the firmness measured after cooking.

15 minutes after cooking: F=48.3 after 6 days at 4° C.: F=77.8

COMPARATIVE EXAMPLE 3

1 kg of cargo rice Khao Dawk Mali having an amylose content equal to 13.4% is steeped at 65° C. for 3 hours, then drained and subjected to a steam treatment under a pressure of 1 bar for 5 min. The moisture content of the rice that has been treated in this way is greater than 31%. Afterwards the rice is dried and then machined. This steamed rice has a cooking-time of 8 min.

COMPARATIVE EXAMPLE 4

1 kg of cargo rice Thai-Bonnet having an amylose content equal to 27% and treated in the same manner as in Comparative Example 3 has a cooking-time of 10 min.

What is claimed is:

1. Parboiled grains of rice that may be rapidly cooked in boiling water and are free of fissures visible to the unaided eye, said grains having an amylose content lower than 15% by weight relative to dry matter and being gelatinized by parboiling so that at least 98% of said grains when placed in a 1.7% solution by weight of KOH for 20 hours are completely translucent grains.

2. The grains of rice of claim 1, wherein said parboiled grains of rice may be fully cooked within five minutes in boiling water.

3. The grains of rice of claim 1, wherein said amylose content is between 10% and 15% by weight.

4. Cooked grains of rice having a reduced firmness after refrigerated storage are prepared from parboiled rice grains having an amylose content lower than 15% by weight relative to dry matter and being substantially gelatinized during the parboiling, said cooked grains of rice, when placed in a hermetically sealed receptacle and maintained at 4° C. for 6 days, having a firmness in the visco-elastograph equal to or less than 120% of the firmness of the grains of rice 15 minutes after cooking, wherein the firmness 15 minutes after cooking and the firmness after maintaining the grains at 4° C. for 6 days is measured as follows:

three grains of rice are placed on the visco-elastograph and the thickness E of the grains before application of a force and the thickness $e_1$ after crushing by said force are noted and the firmness is calculated as $100 \cdot (e_1/E)$.

5. Cooked grains of rice as set forth in claim 4, wherein said parboiled rice is fully cooked within 5 minutes in boiling water.

6. A process for preparing parboiled rice that is suitable for rapid cooking comprising:

a) steeping rice with an amylose content lower than 15% by weight relative to dry matter in water at a temperature lower than 70° C., under such conditions and for such time that, after removal of the surface water by drainage or spin-drying, steeped rice is obtained having a moisture content by weight greater than 31 percent;

b) parboiling the rice from step (a) to gelatinize the rice so that at least 98% of the rice grains when placed in a 1.7% solution by weight KOH for 20 hours are completely translucent grains; and c) drying the rice from step (b).

7. The process of claim 6, wherein step (a) includes steeping rice at a temperature in the range of from 40 to 70° C.

* * * * *